(12) United States Patent
Awatsu et al.

(10) Patent No.: US 6,696,817 B2
(45) Date of Patent: Feb. 24, 2004

(54) BATTERY BOX

(75) Inventors: Katsumi Awatsu, Omagari (JP); Takashi Konishi, Kamioka-Machi (JP)

(73) Assignee: Tanita Corporation, Tokyo (JP)

( * ) Notice: Subject to any disclaimer, the term of this patent is extended or adjusted under 35 U.S.C. 154(b) by 0 days.

(21) Appl. No.: 10/118,376

(22) Filed: Apr. 9, 2002

(65) Prior Publication Data

US 2002/0153861 A1 Oct. 24, 2002

(30) Foreign Application Priority Data

Apr. 18, 2001 (JP) ........................................ 2001-119051
Feb. 28, 2002 (JP) ........................................ 2002-053350

(51) Int. Cl.[7] ................................................. H02J 7/00
(52) U.S. Cl. ....................................... 320/112; 429/100
(58) Field of Search ................................ 320/107, 112; D12/103; 429/99, 100

(56) References Cited

U.S. PATENT DOCUMENTS 3,859,140 A * 1/1975 Schmidt .................. 429/99
5,395,263 A    3/1995 Sandell .................. 439/500

FOREIGN PATENT DOCUMENTS

| JP | 7-85850 | 3/1995 |
| JP | 9-283947 | 10/1997 |
| JP | 10-321205 | 12/1998 |
| JP | 11-167908 | 6/1999 |
| JP | 3086398 | 7/2000 |
| JP | 2001-52665 | 2/2001 |

* cited by examiner

*Primary Examiner*—Gregory J. Toatley, Jr.
(74) *Attorney, Agent, or Firm*—McDermott, Will & Emery

(57) ABSTRACT

An object of the present invention is to provide a battery box which can prevent a dry battery from being inserted in the battery box in an erroneous mode and thus avoid a short-circuit condition of the dry battery. To prevent a lateral face of the dry battery to be inserted in the battery box from coming into contact with an electrode terminal, a contact preventing member which functions as a stopper is provided above at least one of a positive electrode terminal or a negative electrode terminal. In case that the contact preventing member protrudes upwardly over the battery box, a lid of the battery box is provided with a through hole, so as to avoid an interference of the contact preventing member with the lid when the lid is closed. Also, it is possible to design the lid without any through holes, by forming the contact preventing member as a protrusion.

9 Claims, 8 Drawing Sheets

BATTERY BOX

FIELD OF THE INVENTION

The present invention relates to a structure of a battery box in which a dry battery is introduced and secured, and in particular, to a technology for preventing an accidental event resulting from a short-circuit condition of the dry battery.

DESCRIPTION OF THE PRIOR ART

There is a variety of electrical appliances driven by means of dry battery (batteries), and there is a variety type of battery box sections for receiving the dry batteries, which varies corresponding to the types of the dry batteries used in those electrical appliances.

On the one hand, typical dry batteries used for the electrical appliances include a manganese dry battery and an alkaline dry battery, and recently, the alkaline dry battery having a high capacity and an excellent discharge property at a high current has been commonly used in various fields. This alkaline dry battery is similar to the manganese dry battery in an external appearance and a size but more or less different from that in used material and structure.

In contrast to that the manganese dry battery is produced by filling a zinc can with various materials such as zinc chloride and neutral aqueous solution of ammonium chloride, which will be finally sealed with a tube referred to as a metal jacket, the alkaline dry battery is produced by filling an outer case referred to as a positive electrode can with electrolyte and separator prepared as the stuffs, sealing the can, and then wrapping around said can a label indicating a performance of the battery and/or a caution therefor.

As described above, in the alkaline dry battery the positive electrode can is wrapped with the label sheathing and this label sheathing is thin and apt to be torn. Especially, although the positive electrode can and a collector are sealed in their openings, there should be a recess in a connecting surface between them and thus a space created between the label sheathing and the connecting surface. Owing to this, a portion of interest defined in a lower region of the dry battery (at cathode side) has been more apt to be broken.

FIG. 5A is a sectional view showing a structure of a battery box according to the prior art, which comprises a positive electrode terminal 52 and a negative electrode terminal 53 each serving as contact in the left or the right side within the battery box 51. It is to be noted that this battery box is of a type in which two of the dry batteries are received longitudinally one after another.

Generally, to insert the dry batteries into this battery box 51, after first one of the dry batteries 12a has been fitted in the battery box in its positive electrode terminal side, a second one of the batteries 12b is inserted with its cathode side inclined downwardly, as shown in FIG. 5B. Alternatively, after the first one of the dry batteries 12b has been set in the battery box in its negative electrode terminal side, the second one of the dry batteries 12a may be set in the battery box from the positive electrode terminal side of the battery box, as shown in FIG. 5C. Once the batteries have been set by either of those setting methods described above, the setting of the dry batteries should be considered completed.

FIG. 6A shows a case where an erroneous inserting method has been applied to insertion of the alkaline dry batteries into the prior art battery box. As shown in this FIG. 6A, if the dry battery is to be inserted into the battery box 51 with the cathode side of the dry battery 12b lifted upwardly, a lateral face of the dry battery 12b could come into contact with the spring-shaped negative electrode terminal 53. At that time, if an additional force is applied to the dry battery 12b so as to push it into the battery box 51, the dry batteries could be received within the battery box 51 in the condition that the spring is deformed or collapsed as shown in FIG. 6B. If the hand is moved away from the battery under this condition, in most cases, the dry battery would pop out of the battery box 51 by the restoring force of the spring, but if the battery box has a lid and the lid is forced into its closed position under this condition with the spring deformed, then there would be a possibility that the dry batteries could have been housed in an improper state. This is an event that could possibly occur if a user is in a hurry to use the appliance.

If the dry batteries used in this case are the alkaline dry batteries, there is a possibility that a strong contact with the spring-shaped negative electrode terminal 53 made of metal would tear the label sheathing of the outermost layer, thereby bringing the positive electrode can inside thereof into a stripped-out condition. In this condition, if the spring comes into contact with the positive electrode can and the cathode of the dry battery at the same time, it would result in a short-circuit condition (a short). There is a fear that the short-circuit between both electrode terminals of the dry battery could not only reduce the operating life of the dry battery as commonly known well but also induce a heat developed inside thereof and/or a fluid leakage therefrom. There has been further possibility that such an accident may not simply induce a failure of the dry battery but may lead to the failure of the electrical appliances itself dependently on the case.

SUMMARY OF THE INVENTION

The present invention has been made in the light of the circumstance described above, and an object thereof is to provide a battery box which can prevent an erroneous insertion of a dry battery thereby avoiding a short-circuit condition thereof.

A battery box according to the present invention comprises a positive electrode terminal and a negative electrode terminal disposed in opposite ends in the longitudinal direction of a housing section, in which a contact preventing member is disposed in a location above at least one of said positive electrode terminal and said negative electrode terminal for preventing a lateral face of a dry battery to be inserted in the battery box from coming into contact with said at least one of said positive electrode terminal and said negative electrode terminal.

In a battery box according to the present invention, said contact preventing member is formed as a bridge section which is bridged across said housing section in the direction crossing the longitudinal direction of said housing section.

In a battery box according to the present invention, said contact preventing member is formed as a protrusion which is protruding toward an inside of said housing section in the direction crossing the longitudinal direction of said housing section.

Further, in a battery box according to the present invention, said contact preventing member extends only along a region proximal to a front end portion of said negative electrode terminal with respect to said longitudinal direction.

Further, in a battery box according to the present invention, said contact preventing member extends from a region proximal to a front end portion of said negative electrode terminal to a region proximal to an end portion of said housing section with respect to said longitudinal direction.

Still further, in a battery box according to the present invention, said contact preventing members are disposed on respective side walls in opposite sides of said housing section.

Further, in a battery box according to the present invention, said contact preventing member is disposed on a side wall in one side of said housing section.

Yet further, in a battery box according to the present invention, a degree of protrusion of one of the contact preventing members is different from the degree of protrusion of the other one of the contact preventing members.

A battery box according to the present invention further comprises a lid for covering said housing section and said lid has a through hole formed in such a location in which said contact preventing member can penetrate through said lid when the lid is closed.

Further, in a battery box according to the present invention, said at least one of said positive electrode terminal and said negative electrode terminal is the negative electrode terminal and said negative electrode terminal is formed in an elastically deformable spring-like shape.

THE MODE FOR CARRYING OUT THE PRESENT INVENTION

Figure 1:
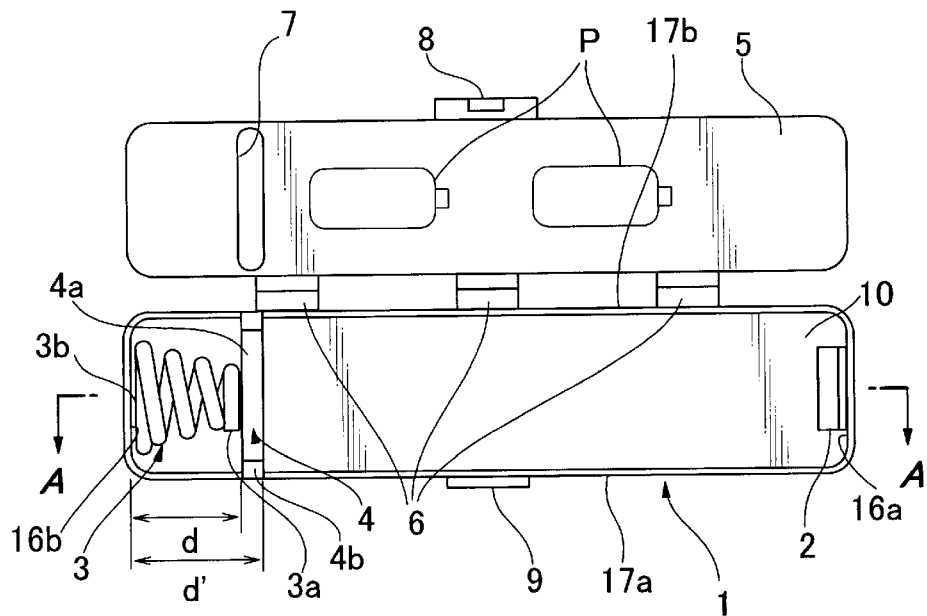
FIG. 1 is an external plan view of a battery box illustrating a first embodiment according to the present invention.

A battery box according to the present invention is provided with a contact preventing member on an upper surface of said sell box in the proximity to a terminal, so that said member functions as a stopper to prevent a lateral face of a dry battery from coming into contact with said terminal. Further in the case of the battery box having a lid, the lid is provided with a through hole so as to avoid interference of the contact preventing member with the lid when the lid is closed. In addition, if a negative electrode terminal of the battery box has a spring-like shape, it can help provide a sufficient contact of the dry battery with the terminal as well as a measure for preventing an erroneous insertion of the dry battery.

According to the present invention, since the contact preventing member extends only along a region proximal to a front end portion of the negative electrode terminal with respect to the longitudinal direction, a structure of the contact preventing member can be simplified.

According to the present invention as defined in claim 2, since the contact preventing member extends from the region proximal to the front end portion of the negative electrode terminal to a region proximal to an end portion of the housing section with respect to the longitudinal direction, a strength of the contact preventing member can be further increased.

According to the present invention as defined in claim 3, since the contact preventing members are provided on both side walls of the housing section, they can reliably prevent the dry battery from coming into contact with the terminal.

According to the present invention as defined in claim 4, since the contact preventing member is provided on one side wall of the housing section, it can reliably prevent the lateral face of the dry battery from coming into contact with the terminal of the battery box even if there is no space available for providing the contact preventing member on the other side wall of the housing.

According to the present invention as defined in claim 5, since a degree of protrusion of one of the contact preventing members is different from the degree of protrusion of the other one of the contact preventing members, the contact preventing member can be provided corresponding to an extent of the space available on the side wall in the other one side of the housing section.

According to the present invention as defined in claim 6, since a lid for covering the housing section is further provided and a through hole is formed in said lid to permit the contact preventing member to pass through it when the lid is closed, therefore it can prevent the contact preventing member from coming into contact with the lid when the lid is closed.

According to the present invention as defined in claim 7, since one of the positive electrode terminal and the negative electrode terminal is a negative electrode terminal and said negative electrode terminal is formed in an elastically deformable spring-like shape, therefore an sufficient contact between the dry battery and the terminal can be accomplished and an erroneous insertion of the dry battery can be still prevented.

DETAILED DESCRIPTION OF THE PREFERRED EMBODIMENTS

A first embodiment of the present invention will now be described with reference to the attached drawings.

FIG. 1 is an external plan view of a battery box according to the present invention, which is of a type for receiving two dry batteries aligned longitudinally in series, shown with a lid being opened. This battery box 1 has a U-shaped housing section 10 with its upper portion being open, and further comprises a positive electrode terminal 2 and a negative electrode terminal 3 arranged respectively on inner end walls 16a and 11b of the housing section 10 so as to oppose with each other. A minimum size of the interior of the housing section 10 is defined as such a size that can allow the inserted dry batteries to be fittingly accommodated in the housing section 10 when a lid 5 is closed. The positive electrode terminal 2 is a contact formed by folding a commonly-used metal plate, and the negative electrode terminal is one having a spring-like shape. Both of them are elastically deformable. Further, a contact preventing member 4 functioning as a stopper is disposed in a spaced relationship from the negative electrode terminal 3 by a small distance. Preferably, this distance should be approximately equal to a free length "d" of the spring-shaped negative electrode terminal 3 (which will be described below in detail).

The contact preventing member 4 may be disposed in either of the negative electrode terminal side or the positive electrode terminal side. For the illustrative purpose, the former example has been employed herein. The contact preventing member 4 may be formed to be integral with the housing 10 as a part thereof. According to the first embodiment of the present invention, this contact preventing member 4 is formed in a location above a region proximal to a front end portion 3a of the negative electrode terminal 3 as a bridge section bridged between side walls 17a and 17b of the housing section 10 along a direction crossing the longitudinal direction connecting one end to the other end of the housing section 10, for example, along the direction approximately orthogonal to the longitudinal direction as shown in FIGS. 3A to 3C. A main body section 4a of the contact preventing member 4 is formed in a bar-shape having an approximately uniform thickness (see FIG. 2, which will be described later). On the other hand, either end portion 4b of the contact preventing member 4 is chamfered, though not clearly seen from the drawing.

A location in which the contact preventing member 4 is to be arranged is defined in such a location that can effectively prevent the contact of the lateral face of the dry battery to be inserted with the negative electrode terminal 3. For example, if the contact preventing member 4 is disposed along the direction approximately orthogonal to the longitudinal direction of the housing section 10 as shown in FIGS. 3A to 3C, preferably the contact preventing member 4 should be disposed in an appropriate location such that the distance "d" defined as from the inner end wall 16b of the housing section 10, on which a rear end portion 3b of the negative electrode terminal 3 is secured, to the front end portion 3a of the negative electrode terminal is approximately equal to or slightly less than the distance "d'" defined as from the inner end wall 16b to the contact preventing member 4 (to a side face thereof more distant from the inner wall 16b). In this first embodiment, the case of the former distance "d" being somewhat smaller than the latter distance "d'" is shown. It is to be appreciated that although in the drawing, the contact preventing member 4 is shown to have a relatively greater length of the distance "d" in comparison with the length of the housing 10 in the longitudinal direction in order to emphasize the location of the contact preventing member 4 (and the size of the negative electrode terminal 3), the distance "d" should be practically smaller than that shown in the drawing.

Further, a lid 5 for covering the battery box 1 is provided via coupling sections 6, and a through hole 7 is formed in a part of the lid 5. These lid 5 and coupling sections 6 are not necessarily required but may be eliminated. The inner side of the lid 5 includes an illustration P for giving an instruction on the inserting direction of the dry batteries, as shown in FIG. 1. It is to be noted that the housing section 10, the lid 5 and the coupling sections 6 may be integrally formed as a single body.

The battery box 1 further comprises a pawl 8 and an engaging latch section 9 so as to prevent the lid 5 from detaching from a main body side of the battery box 1 when the lid 5 is closed.

Figure 2:
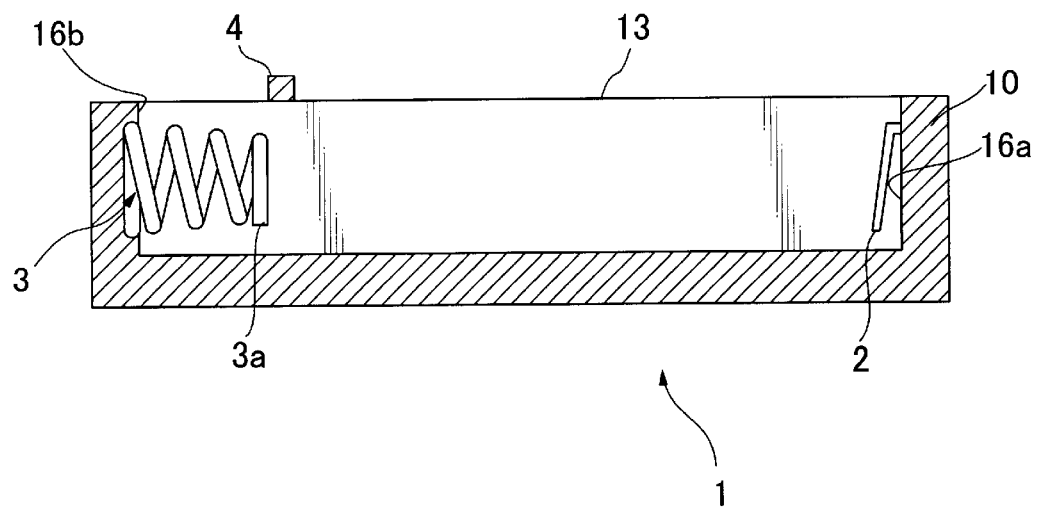
FIG. 2 is a sectional view of the battery box illustrating the first embodiment according to the present invention.
Figure 3A:
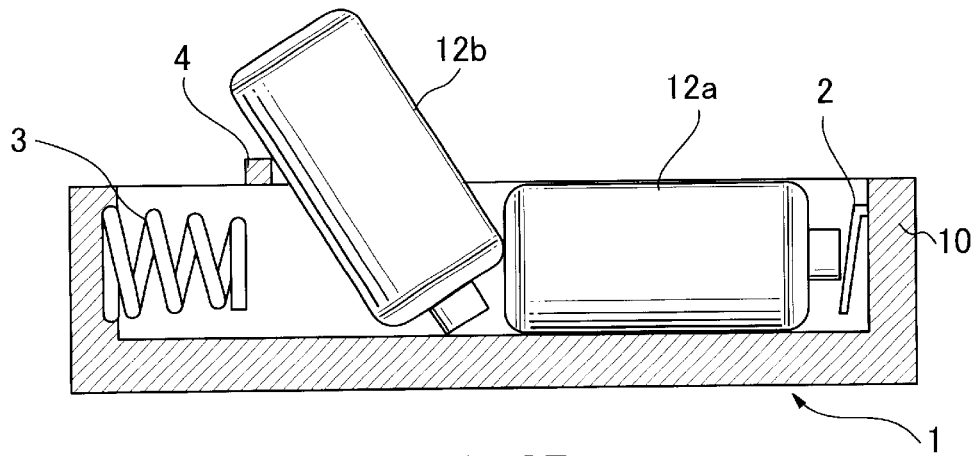
FIGS. 3A to 3C show the battery box of the first embodiment according to the present invention, illustrating dry batteries being inserted in the battery box.
Figure 3B:
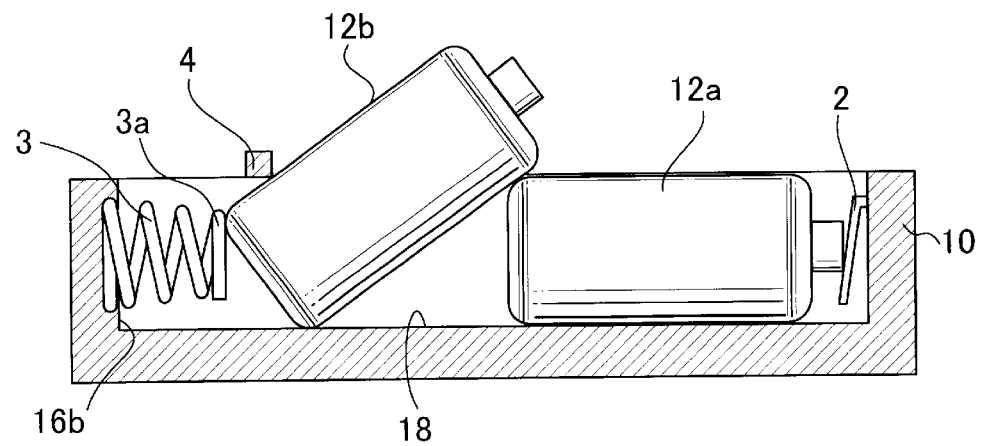
Figure 3C:
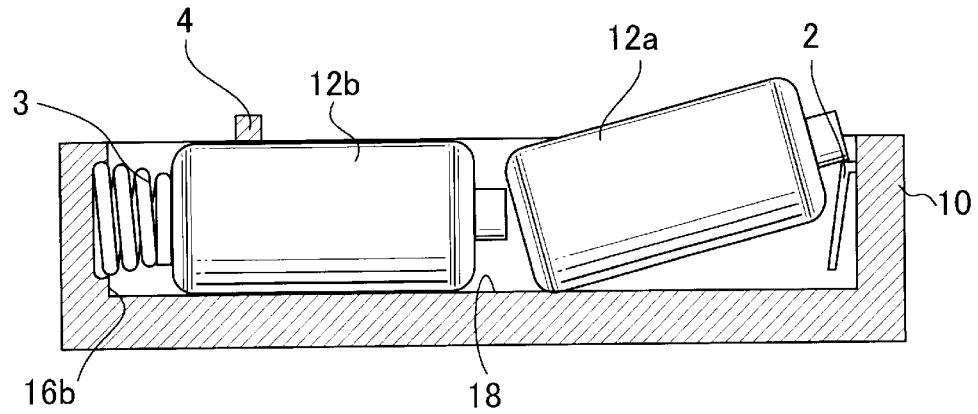

FIG. 2 is a sectional view of the battery box taken along the line A–A' of FIG. 1. As shown in this drawing, the contact preventing member 4 is arranged in such a manner that it is protruding from an upper edge 13 of the housing 10 (which is on the level equal to the height of the dry batteries inserted in the housing 10) upwardly (toward the lid 5 side) to some degree. FIG. 3A shows the dry batteries to be inserted in the battery box 1, and in the case of inserting the two dry batteries longitudinally aligned in series, typically one of the dry batteries should be inserted first and then the other of the dry batteries should be entered diagonally, wherein if upon insertion, the dry battery 12a has been precedently set in the battery box 1 in the positive electrode terminal 2 side, and when the other of the dry batteries 12b is to be inserted, the dry battery 12b is entered diagonally with its anode side inclined downwardly as shown in FIG. 3A, then the lateral face of the dry battery 12b in the cathode side will come into contact with the upper side of the contact preventing member 4 acting as the stopper, thereby inhibiting the dry battery 12b from being fully entered. However, since the contact preventing member 4 functions as the stopper with respect to the dry battery 12b, the contact of the lateral face of the dry battery 12b with the negative electrode terminal 3 could be avoided, which might have occurred in the prior art. On the other hand, if after the dry battery 12a has been precedently set in the battery box 1 in the positive electrode terminal 2 side and the other dry battery 12b is to be inserted with its cathode side inclined downwardly, as shown in FIG. 3B, then the lateral face of the dry battery 12b would come into contact with the lower side of the contact preventing member 4, but nevertheless the dry battery 12b could be allowed to enter between the contact preventing member 4 and a bottom face 18 of the housing section 10 and slide in below the contact preventing member 4. Accordingly, in the example shown in FIG. 3B, the lateral face of the dry battery 12b would not come in contact with the negative electrode terminal 3 and the two dry batteries (especially the dry battery 12b) can be completely inserted in the battery box 1.

In an example shown in FIG. 3C, the two dry batteries may be set as they are aligned longitudinally in series by setting a first one of the dry batteries 12b in the battery box in its negative electrode terminal 3 side in a similar manner to that shown in FIG. 3B and then setting the other dry battery 12a in the battery box in its positive electrode terminal 2 side. In this case, similarly to the case of FIG. 3B, the lateral face of the dry battery would not come into contact with the negative electrode terminal 3 and the two dry batteries can be completely inserted in the battery box 1.

As described above, in the battery box according to the prevent invention, in which the contact preventing member (the stopper) is disposed at the location apart from the inner end wall 16b by a distance approximately equal to the length of the negative electrode terminal 3, the lateral face of the dry battery would never come in contact with the negative electrode terminal, and thus there would be no fear of any tears created in a label sheathing in the case of an alkaline dry battery. Accordingly, there would be no short-circuit event induced, which has been described in the section of THE DESCRIPTION OF THE PRIOR ART, thus preventing an accident associated with the dry battery. Thereby, any failures of an electrical appliance resulting from the dry battery can be prevented as well.

Figure 4:
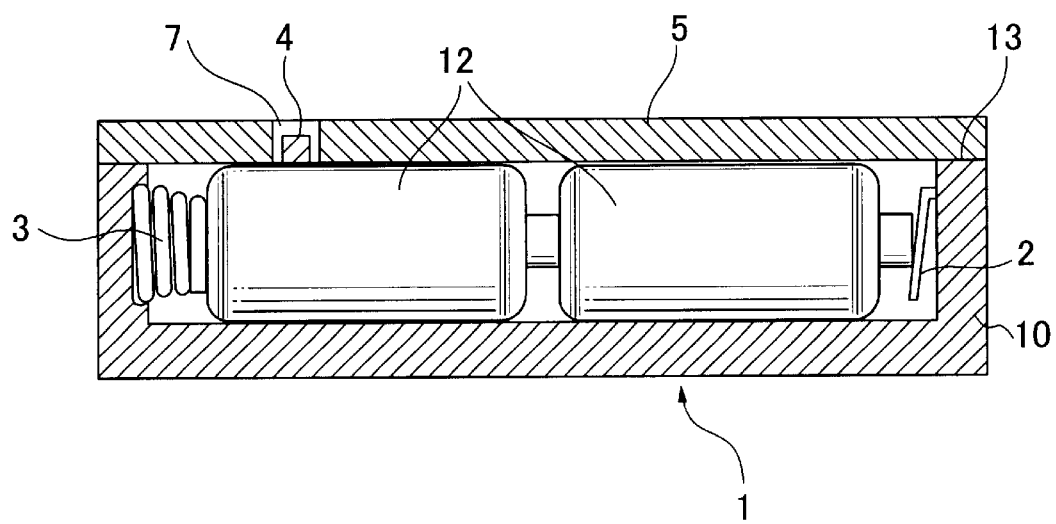
FIG. 4 shows the battery box of the first embodiment according to the present invention, wherein a lid of the battery box is closed.
Figure 5A:
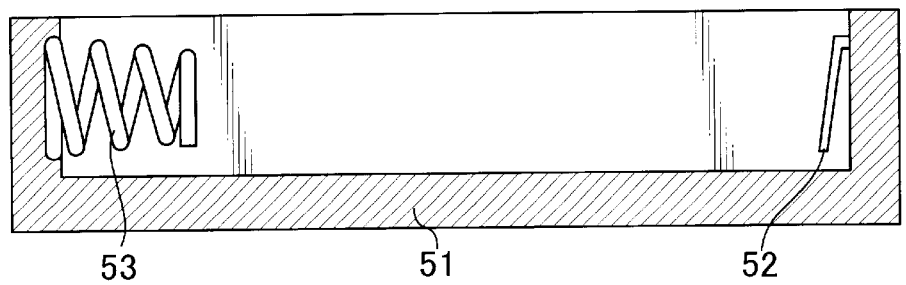
FIGS. 5A to 5C show a condition in which the dry batteries are being inserted into a prior art battery box.
Figure 5B:
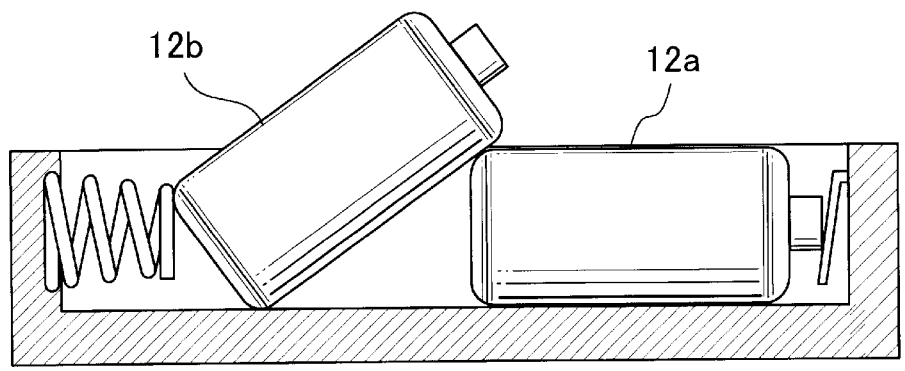
Figure 5C:
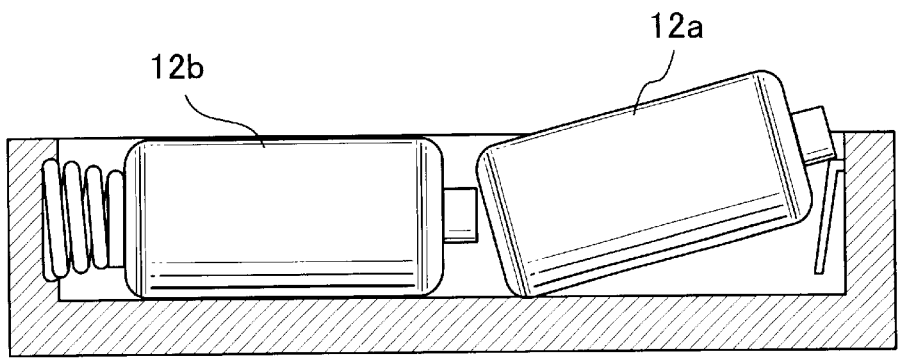
Figure 6A:
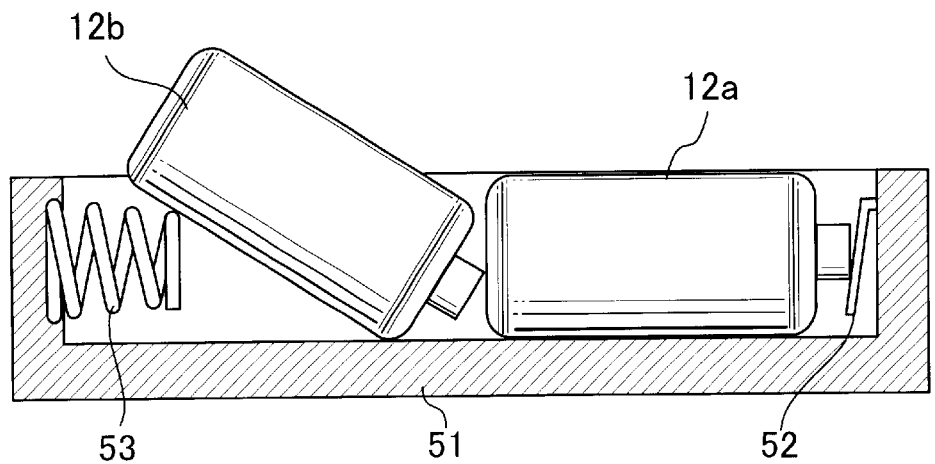
FIGS. 6A and 6B show another condition in which the dry batteries are being inserted into the prior art battery box.
Figure 6B:
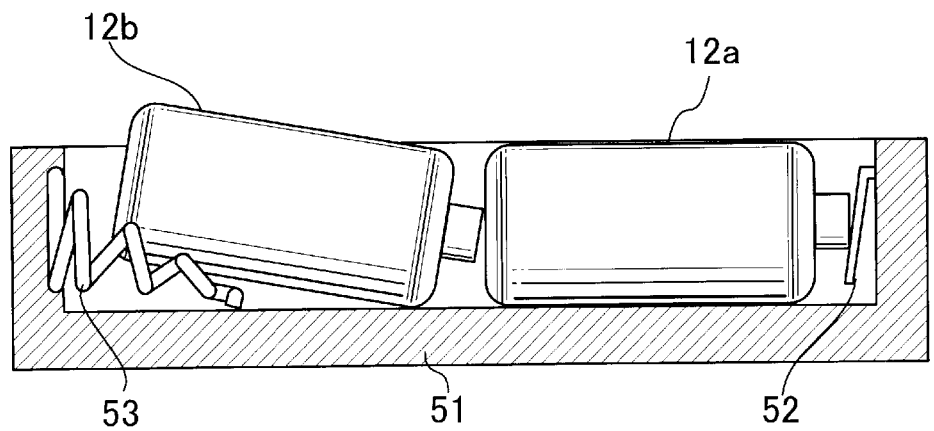

Further, the battery box 1 of the present invention is provided with a through hole 7 formed in the lid 5. As shown in FIG. 4, this through hole 7 is disposed in such a location that permits the contact preventing member 4 to penetrate through the lid 5 when the lid 5 is closed. As described above, since the contact preventing member 4 is chamfered in either end portion 4b, therefore the lid 5 could not bump the contact preventing member 4. This lid 5 can prevent the pop-out of the dry battery as similarly to the prior art battery box, and further, owing to the through hole provided in the lid 5, the battery box 1 with the contact preventing member 4 formed thereon can be designed without increasing the total height of the battery box.

Now, a second embodiment of the present invention will be explained below with reference to FIGS. 7 to 9.

Figure 7:
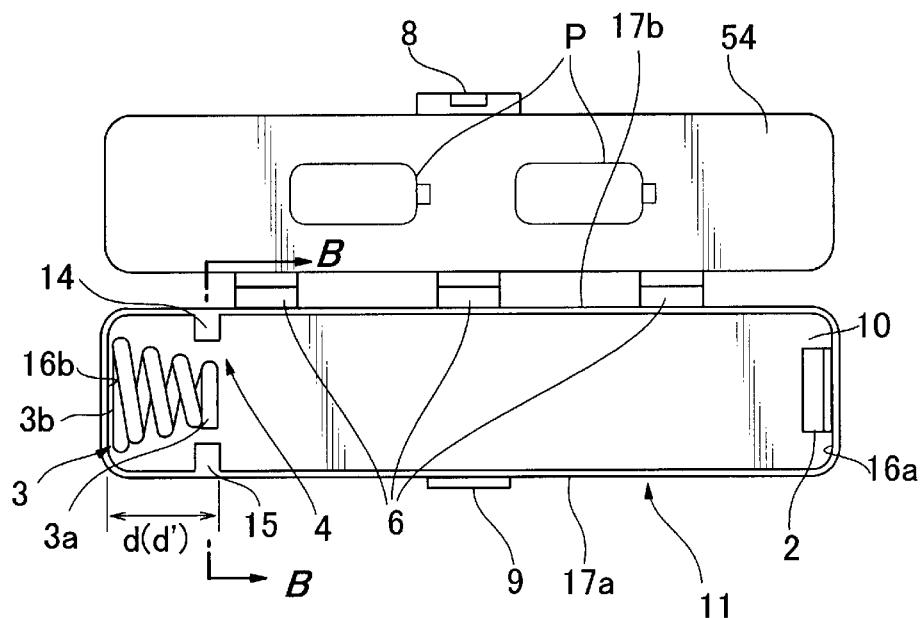
FIG. 7 is an external plan view of a battery box illustrating a second embodiment according to the present invention.
Figure 8:
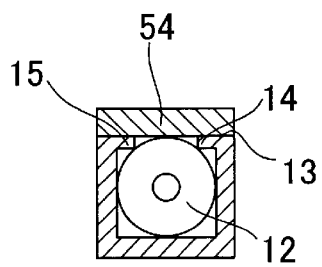
FIG. 8 is a sectional view taken along the line B—B of FIG. 7, illustrating the battery box with the lid being closed and the dry batteries contained therein.

FIG. 7 is an external plan view of a battery box 1 according to the second embodiment of the present invention, shown in the same manner as in FIG. 1, and FIG. 8 is a sectional view taken along the line B–B' of FIG. 7. It is to be noted that differently from FIG. 7, FIG. 8 shows the battery box 1 with a lid 54 closed and a dry battery 12 housed therein. In these drawings, the members similar to those in FIGS. 1 to 6B are designated by using the same reference numerals.

The second embodiment will now be described below, focusing on differences from the first embodiment. Those features which are not otherwise specified could be considered to be same as in the first embodiment.

According to the second embodiment, contact preventing members 14 and 15 are formed above a region proximal to the front end portion 3a of the negative electrode terminal 3 as protrusions which are protruding from respective side walls 17a and 17b of a housing 10 toward the inside thereof opposing with each other along a direction crossing the longitudinal direction of the housing section 10, for example, along the direction approximately orthogonal to the longitudinal direction of the housing section 10 as shown in FIG. 7.

Locations in which the contact preventing member 14 and 15 are to be disposed are, as similarly to the first embodiment, designed in such locations that can prevent effectively the contact of a lateral face of a dry battery with the negative electrode terminal 3. As for these locations, it should be considered that an imaginary line connecting the contact preventing members 14 and 15 with each other corresponds to the contact preventing member 4 in the first embodiment (see FIGS. 3A to 5C). This means that preferably, each of the contact preventing members 14 and 15 should be disposed in the appropriate locations such that the distance "d" defined as from the inner end wall 16b of the housing section 10, on which the rear end portion 3b of the negative electrode terminal 3 is secured, to the front end portion 3a of the negative electrode terminal is approximately equal to or slightly less than the (shortest) distance "d'" defined as from the inner end wall 16b to the imaginary line connecting the contact preventing members 14 and 15 with each other. In the example of FIG. 7 is shown the case of the former distance "d" being approximately equal to the latter distance "d'".

As is obvious from FIG. 8, every part of the cross section of the contact preventing members 14 and 15 is formed by a flat surface. Each of the contact preventing members 14, 15 is formed at a level same as or lower than an upper edge 13 of the housing section 10, which is at a height level of the dry battery, and would never protrude upwardly over the upper edge 13 of the housing section 10 (toward the lid 54 side). Accordingly, this lid 54 in the second embodiment is not required to have such a through hole 7 (see FIGS. 3A to 5C) that has been provided in the lid 5 in the first embodiment. As a matter-of-course, in this second embodiment, the contact preventing member would never increase the total height of the battery box.

It is to be appreciated that the degrees of protrusion of the contact preventing members 14 and 15 within the housing section 10 may be different from each other. For example, the contact preventing member 14 may protrude more toward the inside of the housing as compared with the contact preventing member 15 does. In addition, the contact preventing members are not necessarily required to be disposed on both side walls 17 opposing with each other, but the contact preventing member may be disposed on one of the side walls 17, for example, only on the side wall 17a. Further, if the contact preventing members are provided on both side walls 17, one contact preventing member on one side wall may be offset from the other contact preventing member on the other side wall in the longitudinal direction.

Alternatively, in one variation of the second embodiment, the contact preventing member 14, 15 may be formed so as to protrude upwardly over the upper edge 13 of the housing section 10, as similarly to the contact preventing member 4 in the first embodiment. For example, these contact preventing members 14 and 15 may be formed by dividing the contact preventing member 4 in the first embodiment (see FIGS. 3A to 3C) into two separate parts. It is to be realized that this variation requires a through hole to be formed in a lid as is the case with the first embodiment.

Figure 9:
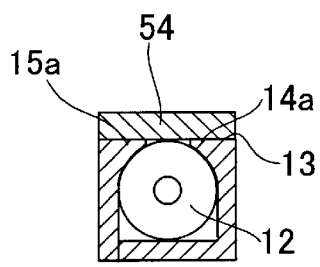
FIG. 9 shows a variation of a section geometry of a contact preventing member of FIG. 8.

FIG. 9 shows a variation of a sectional geometry of the contact preventing member shown in FIG. 8. In contrast to that in the example of FIG. 8, every part of the cross section of the contact preventing members 14 and 15 has been formed by a flat surface, in this variation, a part of the cross section located in a lower side of the contact preventing member 14a, 15a is formed in a curved face corresponding to the surface contour of the dry battery. In other words, the cross section of the contact preventing member 14a, 15a is tapered toward the inside of the housing section 10 corresponding to the surface contour of the dry battery. With such geometry, the contact preventing member 14a, 15a can be accommodated in a relatively small space between the dry battery and the lid 54. Further, it becomes possible to make greater the degree of protrusion of the contact preventing member 14a, 15a toward the inside of the housing 10, thereby preventing more effectively the contact of the terminal with the lateral face of the dry battery.

Finally, a third embodiment of the present invention will be described below with reference to FIG. 10.

Figure 10:
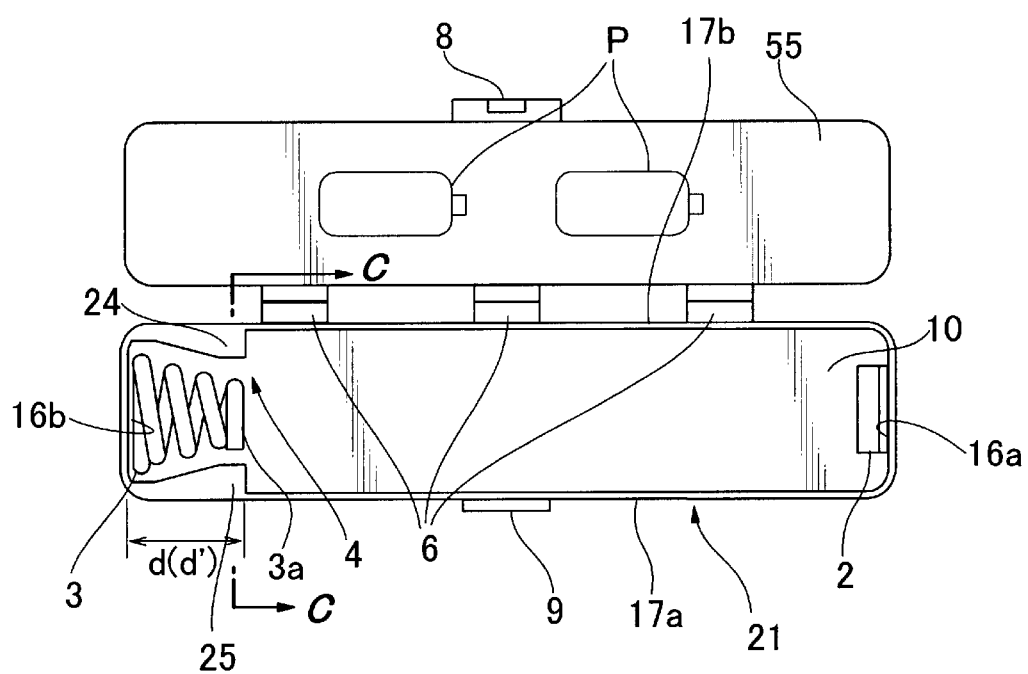
FIG. 10 is an external plan view of a battery box illustrating a third embodiment according to the present invention.
Figure 11:
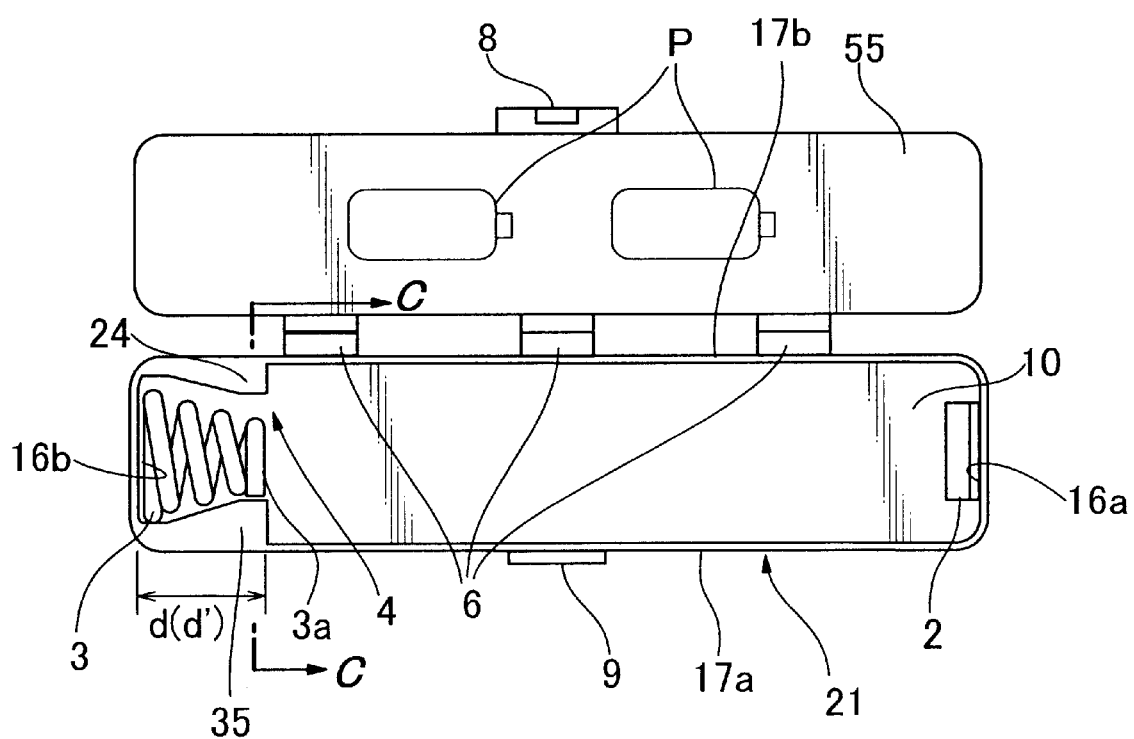
FIG. 11 is an external plan view of a battery box according to another embodiment of the present invention.

FIG. 10 is an external plan view of a battery box according to the third embodiment, shown in the same manner as in FIG. 1 and FIG. 7. In FIG. 10, the members similar to those in FIGS. 1 and 7 are designated by using the same reference numerals. The third embodiment should be considered a variation of the second embodiment. That is, it may be considered that, in contrast to that the contact preventing member 14, 15 of the second embodiment extends only along a region proximal to the front end portion 3a of the negative electrode terminal 3 with respect to the longitudinal direction of the housing section 10, the contact preventing member 24, 25 of the third embodiment extends over a range from the region proximal to the front end portion 3a of the negative electrode terminal 3 to a region proximal to one end portion (an inner end wall 16b) of the housing section 10 with respect to the longitudinal direction of the housing section 10. Other features may be considered the same as those of the second embodiment. For example, the degree of protrusion of the contact preventing member 24 within housing 10 can be different than the degree of protrusion of contact preventing member 35, as shown in FIG. 11. As is the case with this third embodiment, by elongating the contact preventing member along the longitudinal direction of the housing section, the strength of the contact preventing member can be improved significantly as compared with that of the second embodiment. It is to be appreciated that a cross section C–C' of the battery box 21 according to this third embodiment may be of similar geometry to that defined in FIG. 8 or FIG. 9, and also the cross section of the elongated portion of the contact preventing member 24, 25 may have a similar geometry to that. As being obvious, also in this third embodiment similarly to the second embodiment, the contact preventing members 24 and 25 have been formed below the level of the upper edge 13 of the housing section 10 and thus they would never protrude upwardly over the upper edge 13 of the housing section 10 (toward a lid 55 side).

Although the embodiments of the present invention have been illustrated and explained with respect to a configuration in which two dry batteries are aligned longitudinally in series, the present invention is not limited to this but may be employed regardless of the number of the dry batteries used. Further, the present invention can be applied even to a configuration in which the dry batteries is inserted in parallel by arranging the contact preventing members in respective locations.

Although the present invention has been explained as a means for avoiding an event that could occur principally in an alkaline dry battery classified according to the dry battery category, a battery box according to the present invention may be employed regardless of the category of the dry battery used.

Effect of the Invention

A battery box according to the present invention, which includes a member on an upper face thereof in the proximity to a terminal for preventing a lateral face of a dry battery to be inserted from coming into contact with the terminal, can prevent a tear in a label of the dry battery and thereby avoid an accident of the dry battery.

Further, since the battery box according to the present invention comprises a contact preventing member as well as a lid provided with a through hole formed in a location where the contact preventing member penetrates through the lid when closed, the battery box can be designed without increasing its profile and still can prevent pop-up of the dry battery. Further, with the contact preventing member, which has been formed as a protrusion, it will also become possible to design the battery box without increasing its profile even if no through hole is provided.

In addition, if a contact terminal of the battery box of the present invention has a spring-like shape, a sufficient contact can be obtained by an expanding and contracting force from the spring under the condition where the dry batteries having been inserted, and the battery box of the present invention, which further comprises the contact preventing member, can prevent a tear in a sheathing label which would otherwise occur due to an erroneous inserting action of the dry battery, thus providing a safety.

What is claimed is:

1. A battery box comprising:
   a positive electrode terminal and a negative electrode terminal disposed at opposite ends in the longitudinal direction of a housing section; and
   a contact preventing member for preventing a lateral face of a dry battery to be inserted in said housing section from coming into contact with said negative electrode terminal;
   wherein said contact preventing member is formed at an upper edge of the housing section and is disposed above said negative electrode terminal and not above a portion of said negative electrode terminal which is in contact with a negative terminal of the battery when the battery is inserted in said housing section, and includes a bridge section which is bridged across said housing section along a direction crossing the longitudinal direction of said housing section.

2. A battery box comprising:
   a positive electrode terminal and a negative electrode terminal disposed at opposite ends in the longitudinal direction of a housing section; and
   at least one contact preventing member for preventing a lateral face of a dry battery to be inserted in said housing section from coming into contact with at least one of said positive electrode terminal and said negative electrode terminal;
   wherein
   said contact preventing member is formed at an upper edge of the housing section and is disposed between said negative electrode terminal and a side wall in the longitudinal direction of said housing section, and extends over a range from a region proximal to a front end portion of said negative electrode terminal to a region proximal to an end portion of said housing section with respect to said longitudinal direction.

3. A battery box in accordance with claim 2, in which said contact preventing members are disposed on both side walls of said housing section.

4. A battery box in accordance with claim 2, in which said contact preventing member is disposed on one side wall of said housing section.

5. A battery box in accordance with claim 3, in which a degree of protrusion of one of the contact preventing members is different from that of the other one of the contact preventing members.

6. A battery box in accordance with claim 1, further comprising a lid for covering said housing section, wherein said lid has a through hole formed in such a location where said contact preventing member can penetrate through said lid when said lid is closed.

7. A battery box in accordance with an one of claims 1 and 2 to 6, in which said at least one of said positive electrode terminal and said negative electrode terminal is the negative electrode terminal and said negative electrode terminal has an elastically deformable spring-like shape.

8. A battery box comprising:
   a positive electrode terminal and a negative electrode terminal disposed at in opposite ends in the longitudinal direction of a housing section;
   a contact preventing member which is formed at an upper edge of the housing section and is disposed above said negative electrode terminal and not above a portion of said negative electrode terminal which is in contact with a negative terminal of the battery when the battery is inserted in said housing section, and includes a bridge section disposed in location above at least one of said positive electrode terminal or said negative electrode terminal, and bridged across said housing section along a direction crossing the longitudinal direction of said housing section;

a lid for covering said housing section, said lid having a through hole formed in such a location where said contact preventing member can penetrate through said lid when said lid is closed; and a plurality of coupling sections for coupling said lid with a side wall in the longitudinal direction of said housing section.

9. A battery box in accordance with claim 8, in which said at least one of said positive electrode terminal and said negative electrode terminal is the negative electrode terminal and said negative electrode terminal has an elastically deformable spring-like shape.

* * * * *